(12) United States Patent
Leny et al.

(10) Patent No.: US 8,922,659 B2
(45) Date of Patent: Dec. 30, 2014

(54) DYNAMICALLY RECONFIGURABLE INTELLIGENT VIDEO SURVEILLANCE SYSTEM

(75) Inventors: Marc Leny, Nanterre (FR); Didier Nicholson, Asnieres sur Seine (FR); Cédric Le Barz, Limours en Hurepoix (FR)

(73) Assignee: Thales, Neuilly sur Seine (FR)

( * ) Notice: Subject to any disclaimer, the term of this patent is extended or adjusted under 35 U.S.C. 154(b) by 462 days.

(21) Appl. No.: 13/218,807

(22) Filed: Aug. 26, 2011

(65) Prior Publication Data

US 2012/0218416 A1    Aug. 30, 2012

Related U.S. Application Data

(63) Continuation of application No. 12/996,369, filed as application No. PCT/EP2009/056684 on May 29, 2009, now abandoned.

(30) Foreign Application Priority Data

Jun. 3, 2008 (FR) ...................... 08 03052

(51) Int. Cl.
  *H04N 7/18*   (2006.01)
  *G06F 15/16*  (2006.01)
  *H04N 9/47*   (2006.01)

(52) U.S. Cl.
  CPC ............... *H04N 7/181* (2013.01); *H04N 7/185* (2013.01)
  USPC .......................................... 348/159; 725/105

(58) Field of Classification Search
  USPC ........................................................ 348/159
  See application file for complete search history.

(56) References Cited

U.S. PATENT DOCUMENTS 7,046,143 B2 *  5/2006  Al-Khateeb ................... 340/541
7,177,448 B1    2/2007  Sah
(Continued)

FOREIGN PATENT DOCUMENTS

EP    1 173 020 A2    1/2002
WO   2006/010910 A1   2/2006

OTHER PUBLICATIONS

Marc Leny et al., "Statistical motion vector analysis for object tracking in compressed video streams", Image Processing: Algorithms and Systems VI, edited by Jaakko T. Astola, Karen O. Egiazarian, Edward R. Dougherty, Proc. of SPIE-IS&T Electronic Imaging, SPIE vol. 6812, 68120Y-1.

(Continued)

*Primary Examiner* — Sath V Perungavoor
*Assistant Examiner* — Howard D Brown, Jr.
(74) *Attorney, Agent, or Firm* — Baker & Hostetler LLP (57) ABSTRACT

A dynamically reconfigurable video surveillance system includes at least one video camera, a remote server, at least one viewing terminal, means making it possible to record the video sequences captured by the camera or cameras, said system being characterized in that: the video camera or cameras and the remote server include means for communicating with one another across a telecommunications network; the video camera or cameras include means for compressing the video sequences captured, the compression rate being adapted dynamically by taking account of the control messages originating from the remote server; the video camera or cameras include means for analyzing said video sequences in the compressed domain, to characterize the activity detected in their field of vision and to forward the result of this characterization to the remote server; the remote server include means for computing for each of the compressed video streams originating from the video camera or cameras a command making it possible to parametrize each of them by taking account of the signaling data received.

16 Claims, 4 Drawing Sheets

(56) References Cited

U.S. PATENT DOCUMENTS

| | | | | |
|---|---|---|---|---|
| 7,944,470 | B2* | 5/2011 | Foster et al. | 348/143 |
| 8,363,106 | B2* | 1/2013 | Martin et al. | 348/155 |
| 2004/0105006 | A1* | 6/2004 | Lazo et al. | 348/169 |
| 2005/0091311 | A1 | 4/2005 | Lund et al. | |
| 2006/0053459 | A1* | 3/2006 | Simerly et al. | 725/105 |
| 2006/0070108 | A1* | 3/2006 | Renkis | 725/105 |
| 2006/0095539 | A1* | 5/2006 | Renkis | 709/217 |
| 2006/0104345 | A1 | 5/2006 | Millar et al. | |
| 2006/0159339 | A1* | 7/2006 | Chai et al. | 382/168 |
| 2006/0188013 | A1 | 8/2006 | Coimbra | |
| 2007/0024705 | A1 | 2/2007 | Richter et al. | |
| 2007/0107029 | A1 | 5/2007 | Monroe et al. | |
| 2007/0174881 | A1 | 7/2007 | Idehara et al. | |
| 2007/0296817 | A1* | 12/2007 | Ebrahimi et al. | 348/161 |
| 2012/0218416 | A1* | 8/2012 | Leny et al. | 348/159 |

OTHER PUBLICATIONS

International Search Report for PCT/EP2009/056684 (Sep. 1, 2009).
International Preliminary Report on Patentability for PCT/EP2009/056684 (Sep. 14, 2010).

* cited by examiner

DYNAMICALLY RECONFIGURABLE INTELLIGENT VIDEO SURVEILLANCE SYSTEM

CROSS-REFERENCE TO RELATED APPLICATIONS

This application is a continuation of U.S. patent application Ser. No. 12/996,369, filed on Dec. 3, 2010, which is a National Stage of International patent application PCT/EP2009/056684, filed on May 29, 2009, which claims priority to foreign French patent application No. FR 0803052, filed on Jun. 3, 2008, the disclosures of each of which are incorporated by reference in their entireties.

FIELD OF THE INVENTION

The invention relates to a video surveillance system relying on a network furnished with at least one intelligent camera and capable of reconfiguring itself dynamically. In the description of the invention, "intelligent camera" designates a camera comprising means making it possible to compress the captured video sequence. It may also be an analog or digital camera coupled with a compression box. In both cases, this "intelligent camera" is also capable of performing an analysis of said sequence in the compressed domain. The intelligent camera is furthermore capable of transmitting the compressed video sequence and the result of the analysis in the compressed domain to a server across a telecommunications network.

In the description, the expression "foreground plane" is used to designate the mobile object or objects of a video sequence. The expression "background plane" will on the other hand refer to the environment as well as to the fixed or quasi-fixed objects of the sequence. This comprises, for example, the ground, trees or other stationary or not perfectly stationary objects.

Moreover, the expressions "video sequence" or "video stream" designate one and the same object.

BACKGROUND

Video surveillance systems have evolved considerably in recent years. The digitization of contents and the increase in the computational capabilities of computers enable the real-time processing of video sequences for their interpretation. New systems have appeared in the last few years and are customarily referred to as intelligent video surveillance systems. These systems rely on image and/or video processing techniques making it possible for example to compare images, to detect motion, to detect a face or to recognize an object.

A conventional video surveillance system generally comprises the following elements:
- at least one analog or digital camera for capturing a video sequence;
- at least one remote server capable of processing the video sequences transmitted by the camera or cameras of the system;
- at least one terminal making it possible to view and/or store the video sequences;
- at least one memory area making it possible to store the video sequences.

Until recently, the main task of the video camera or cameras was to capture and to compress the digital video stream before transmission to the remote server via a telecommunications network. The desire to make ever more effective use of the bandwidth of the transmission media on which these sequences travel and the objectives of reducing the cost of their storage very soon posed the question of video compression. Conventional compression algorithms make it possible to reduce the spatial redundancy and the temporal redundancy specific to a video sequence. These compression techniques make it possible to reduce the bit rate required for the transmission of a video stream across, for example, a telecommunications network. In existing video encoding systems, it is necessary to select a compression rate suited to the application and therefore to the service considered. Indeed, the more compressed the video stream and therefore the lower the bit rate, the more degraded may be the quality of the video such as perceived by the user of the service. It is consequently important to correctly choose the transmission bit rate for these streams. Numerous schemes for carrying out this bit rate allocation exist. The existing techniques make it possible to adapt the bit rate of the video streams to the bandwidth constraints of telecommunications networks.

As stressed previously, one of the key constituent elements of a video surveillance system is the remote server. Its role is customarily to carry out analyses on the video stream after decompression. These analyses, for example the identification of the mobile objects of a video stream, are traditionally carried out at the level of the remote server and not of the cameras since the latter require algorithmic tools capable of analyzing an uncompressed video stream. Indeed, the video stream is analyzed at the image pixel level, thereby requiring considerable resources in terms of computations and memory. It is for this reason that the analysis of the video streams was not until recently conducted by the cameras but remotely on a server possessing sufficient resources to decompress the streams and analyze them.

Figure 1:
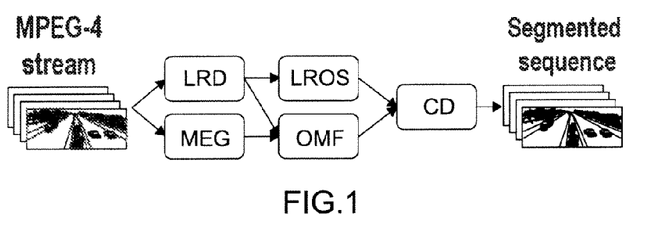
FIG. 1 presents the modules such as previously described used for the analysis in the compressed domain.

Today it is possible to conduct video sequence analyses in the compressed domain and therefore to reduce the computational and memory loads required for the analysis of a video stream. The benefit of this scheme is that it uses a part of the work performed by the video encoder and thus utilizes information available in the compressed domain such as, for example, the coefficients computed by applying the Discrete Cosine Transform (DCT) and the motion estimation vectors. This information must thereafter be analyzed. Indeed, the motion estimation vectors do not necessarily correspond to a real motion of an object in the video sequence but may be akin to noise. By using this scheme it is then possible, for example, to identify the areas of the image comprising mobile objects. The computational load becoming reasonable, the video cameras can take charge of the analysis of the video streams. Various steps are necessary for using this information to identify the mobile objects. An overview of the various work described in the patent proposal Optical flow estimation method (US2006/0188013A1) has made it possible to delimit five functions identified in the article *Statistical motion vector analysis for tracking in compressed video stream* by Marc Leny, Frangoise Prêteux and Didier Nicholson. These modules are illustrated in FIG. 1 and described hereinbelow:
- the Low Resolution Decoder (LRD) makes it possible to reconstruct the entirety of a sequence at the resolution of the block, deleting on this scale the motion prediction;
- the Motion Estimation vectors Generator (MEG) determines, for its part, vectors for the set of blocks that the coder has coded in "Intra" mode (within Intra or predicted images);
- the Low Resolution Object Segmentation (LROS) relies, for its part, on an estimation of the background in the compressed domain by virtue of the sequences reconstructed by the LRD and therefore gives a first estimation of the mobile objects;

the Object Motion Filtering (OMF) uses the vectors output by the MEG to determine the mobile areas on the basis of the motion estimation;

a Cooperative Decision (CD) is established on the basis of these two segmentations, taking into account the specifics of each module depending on the type of image analyzed (Intra or predicted).

Figure 2:
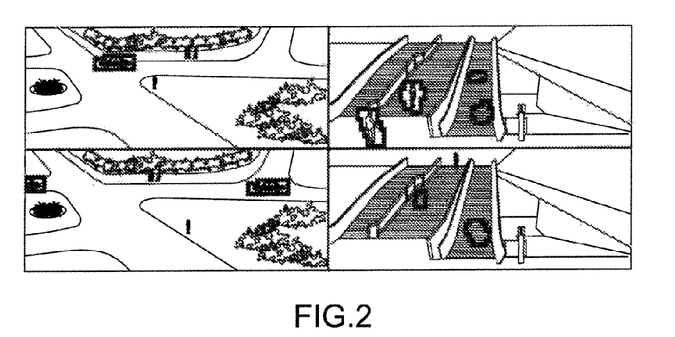
FIG. 2 illustrates a possible result of the analysis in the compressed domain, namely the identification of areas containing mobile objects.
Figure 3:
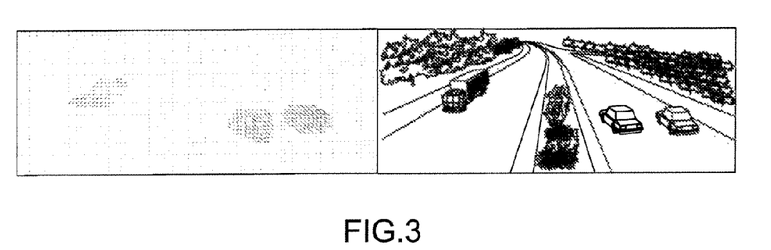
FIG. 3 shows another exemplary result of the analysis in the compressed domain, namely a motion map established on the basis of the motion estimation vectors.
Figure 4:
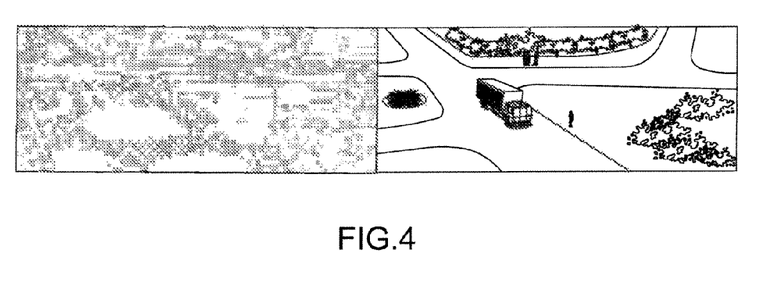
FIG. 4 shows another exemplary result of the analysis in the compressed domain, namely a low resolution confidence map corresponding to the edges of the image.

The results of the analysis in the compressed domain allow the identification of areas containing mobile objects (FIG. 2), the generation of motion maps established on the basis of the motion estimation vectors (FIG. 3) and of confidence maps corresponding to the edges of the low resolution image (FIG. 4).

The main benefit of the analysis in the compressed domain pertains to the computation times which are considerably reduced relative to the conventional analysis tools. By relying on the work performed during video compression, analysis times are today from tenfold to twentyfold the real time (250 to 500 images processed per second) for 720×576 4:2:0 images.

In a video surveillance system comprising a significant number of video cameras communicating with a remote server by virtue of a telecommunications network, the available bandwidth specific to the dimensioning of the telecommunications network must be shared. A conventional video surveillance network architecture relies on an initial network dimensioning making it possible either to transport the streams coming from the whole set of video sensors or cameras simultaneously, or taking into account a periodic switching from one stream to another. It is then at the level of the surveillance room that the operator or powerful computational and analysis servers may request the visualization of a precise stream depending on the importance accorded.

In these conventional systems, it is frequently the case that video streams not comprising any relevant information are transmitted from the sensors to the processing servers. In this case, the use of the resources of the telecommunications network used is not optimized.

SUMMARY OF THE INVENTION

The subject of the present invention relates to an intelligent video surveillance system having notably the ability to reconfigure itself automatically so as to be able, for example, to optimize the use of the resources of said system. This system relies on the use of intelligent cameras having the ability to compress and to analyze in the compressed domain the video sequences that they capture and to detect specific events therein. Signaling data are thereafter transmitted across a telecommunications network by the intelligent cameras to a remote server. This server is capable of analyzing these signaling data so as to determine commands making it possible to reconfigure the elements of the system in a dynamic manner.

More precisely the subject of the invention is a dynamically reconfigurable video surveillance system composed of at least one video camera, of a remote server, of at least one viewing terminal, of means making it possible to record the video sequences captured by the camera or cameras, said system being characterized in that:

the video camera or cameras and the remote server comprise means for communicating with one another across a telecommunications network;

the video camera or cameras comprise means for compressing the video sequences captured, the compression rate being adapted dynamically by taking account of the control messages originating from the remote server;

the video camera or cameras comprise means for analyzing said video sequences in the compressed domain, for characterizing the activity detected in their field of vision and for transmitting the result of this characterization to the remote server;

the remote server comprises means for computing for each of the compressed video streams originating from the video camera or cameras a command, making it possible to parametrize each of them by taking account of the signaling data received.

One variant of this video surveillance system is characterized in that a priority level is associated by the server with each of the video streams received originating from the camera or cameras of the system, said priority level being determined as a function of the signaling information representative of the activity detected and forwarded by the video camera or cameras.

One variant of this video surveillance system is characterized in that the remote server controls the transmission of the signaling data dispatched by the video camera or cameras of the system by dispatching requests making it possible to adapt the frequency, the type and the content of the signaling messages.

One variant of this video surveillance system is characterized in that the compression of the video sequences captured by the cameras is parametrized by a bit rate directive specific to each camera, said bit rate directive being computed by the remote server as a function of the priority level associated with each of the video streams and is thereafter transmitted by the server to each of the cameras of the system.

One variant of this video surveillance system is characterized in that a priority level associated with the video streams is computed by each camera, said order of priority being determined as a function of the activity detected by each of the cameras.

One variant of this video surveillance system is characterized in that the priority level associated with the video streams is transmitted to the server by each of the cameras of the system and that said server uses this signaling information so as to compute a bit rate command transmitted to the cameras so that the latter adapt their compression parameters so as to satisfy this target bit rate constraint.

One variant of this video surveillance system is characterized in that the priority level of the video stream is used by each camera to compute a bit rate directive, said bit rate directive being used to adapt the video stream compression parameters.

One variant of this video surveillance system is characterized in that the automatic switching of the display on the viewing terminal or terminals is of a duration determined by the order of priority, said duration being all the longer the more important the corresponding order of priority.

One variant of this video surveillance system is characterized in that the display on the viewing terminal or terminals of a priority video stream is accompanied by an augmented-reality mechanism making it possible to bring to the fore the portion or portions of the image containing the unusual activity identified by the intelligent camera.

One variant of this video surveillance system is characterized in that the augmented-reality mechanism is controlled by the remote server and that said server consequently transmits a request to the corresponding intelligent camera so as to acquire the necessary signaling data.

One variant of this video surveillance system is characterized in that the portion or portions of the image containing the unusual activity are brought to the fore by one or more flashing or fixed rectangle(s).

One variant of this video surveillance system is characterized in that the portion or portions of the image containing the unusual activity are brought to the fore by a color highlighting.

One variant of this video surveillance system is characterized in that the bringing to the fore of the portion of the image containing the unusual activity identified by the intelligent camera is accompanied by a message displayed on the screen of at least one viewing terminal.

One variant of this video surveillance system is characterized in that the bringing to the fore of the portion of the image containing the unusual activity identified by the intelligent camera is accompanied by an alarm telltale.

One variant of this video surveillance system is characterized in that the compressed video streams are recorded in a memory area of the system and that the control data, such as the priority level of the streams and the metadata originating from the targeted cameras, are also recorded.

One variant of this video surveillance system is characterized in that a supervised mode of the system allows an operator to select a particular, not necessarily priority, video stream and that the server reacts accordingly by decreasing the global bit rate and by ordering a maximum bit rate for the chosen camera.

BRIEF DESCRIPTION OF THE DRAWINGS

The invention will be better understood and other advantages will become apparent on reading the nonlimiting description which follows given in conjunction with the appended figures.

DETAILED DESCRIPTION

Figure 5:
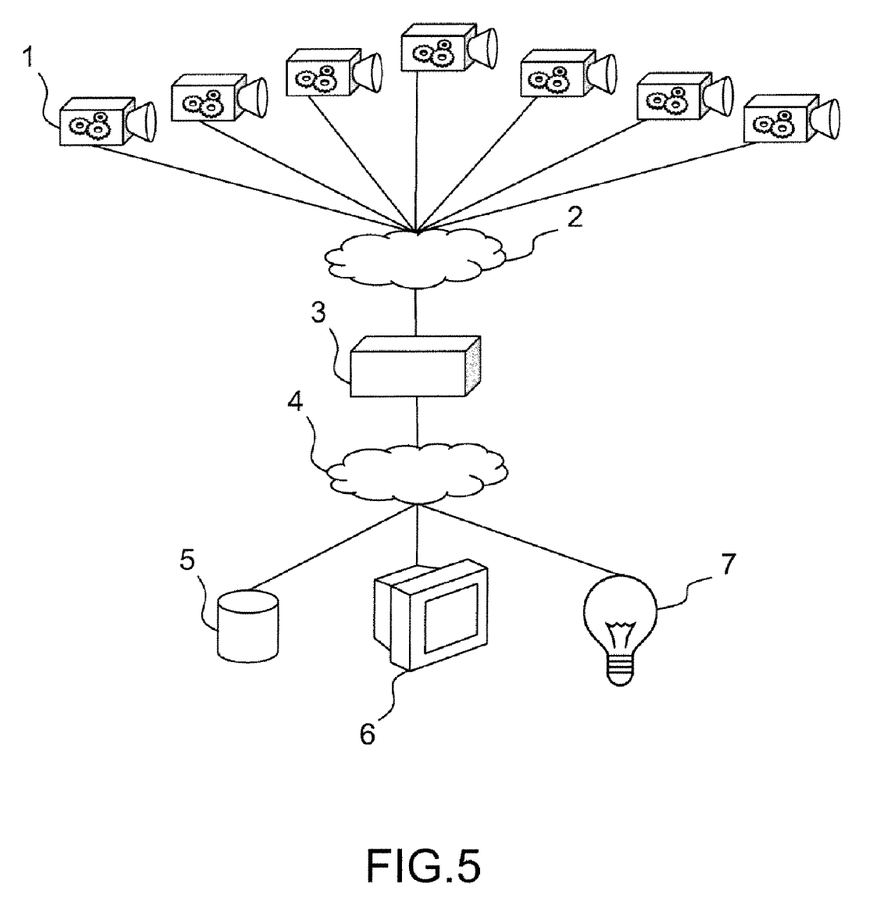
FIG. 5 illustrates a variant of the architecture of the video surveillance system according to the invention.

The video surveillance system according to the invention relies on an architecture an example of which is given in FIG. 5. The areas to be subject to surveillance are covered with the aid of at least one video camera 1 termed intelligent camera(s). These intelligent cameras are capable at least:
of capturing a video sequence of the area that they cover;
of compressing the video sequence (by using for example the compression techniques described in the MPEG-2 and MPEG-4 standards);
of analyzing the video sequences in the compressed domain;
of characterizing the activity detected in the area covered by the camera.

The analysis in the compressed domain allows these intelligent cameras to characterize relevant activities in the sense of the service rendered by the system. The benefit of performing these operations in the compressed domain is to reduce the computation times and the memory resources required for the analysis and therefore to make it possible to embed these analysis tools aboard the cameras. For example, segmentation of the mobile objects and tracking of these objects over the video streams may be carried out at low cost. It is thereafter possible to integrate into each camera tools for modeling and for characterizing activity by using, for example, Gaussians Mixture Modeling (GMM) techniques taking into account the data arising from the objects tracked (points of entry to and exit from the field of vision, trajectory, speed, acceleration, size, etc). An unsupervised learning phase is in this case necessary at the level of each camera, to which can be added one or more supervised step(s) for specifying the type of abnormal behavior to be uploaded by priority to the remote server 3 (identification of a portion of sequence by an operator, reconstruction by acted scenes, etc.).

The relevant activities that may be detected by the intelligent cameras are, for example:
a car traveling the wrong way (within the framework of a road traffic surveillance service);
a crowd motion, that may be the consequence of a critical event such as
a fire;
an individual behaving suspiciously in a parking lot;
a crazed departure from a point that may be triggered by any event said to be unusual with respect to a given manner of operation.

These cameras communicate the video streams and the signaling data representative of the activity detected, if any, to a remote server 3, doing so through a first telecommunications network 2. These signaling data may be, for example:
the number of mobile objects detected;
the surface area covered by the mobile objects;
the speed of displacement of the mobile objects;
the location of the mobile objects;
etc.

This telecommunications network may be, for example, a fiber optic network or else a wireless network using the Internet Protocol (IP).

The role of the remote server 3 is to route the video streams that it receives from the intelligent cameras to one or more storage servers 5, one or more control terminals 6 allowing one or more operators to monitor the areas under surveillance, doing so through a second telecommunications network 4. The remote server 3 is furthermore capable of triggering alarm signals 7 remotely. The server also makes it possible to process the signaling data forwarded by the intelligent cameras. It can for example rank the video streams received by order of priority and use information to dynamically reconfigure the video surveillance system.

The remote server 3 can moreover manage several tasks linked with the surveillance post(s) 6:
The automatic switching from one video stream to another on the monitor with a display of a duration determined according to the order of priority. If several streams are considered to have high priority (by thresholding on the priority, for example), the server will be able to display a mosaic of these streams, continuing the switching to the other streams in one of the windows.

The display of a priority stream can be accompanied by an augmented-reality aspect by bringing to the fore the portion of the image containing the unusual activity identified by the camera. The type of technique used may be for example: the use of a flashing rectangle, color highlighting, etc. This can be accompanied by a message on the screen and/or by an alarm telltale. All of this is done via a request from the server 3 to obtain the corresponding signaling data for the camera concerned.

The recording of the streams in a memory area 5 of the network with their levels of priorities, optionally accompanied by signaling data originating from the targeted cameras, for example in the case of high priorities.

The consideration of a supervised mode: the operator can select a particular, not necessarily priority, stream, depending on the camera. The server then decreases the global bit rate (greater total priority P) and orders a maximum bit rate for the chosen camera.

Etc.

A variant making it possible to reduce the transmission bit rate for the signaling information traveling from the cameras to the server is to upload only a single indicator of priority per camera. Indeed, all the signaling data available as output from one of the cameras 1 can (if the amount of signaling data is large) represent a non-negligible volume of information and it is not always necessary to transmit them permanently over the network.

In another variant of the invention, the video cameras 1 transmit a set of signaling information (also referred to as metadata) to the remote server 3. In this case, it is the responsibility of the server to associate a priority with each of the streams on the basis of this information so as thereafter to determine the commands making it possible to dynamically reconfigure the system. The remote server can dispatch an outside request so as to command the transmission of all or part of the signaling data. If the activity detected complies with the model established by learning and if therefore the normalized maximum likelihood is close to 1, the priority will be zero or very low. The further this activity deviates from the model, the higher the order of priority. A numerical priority of between 0 and 1 is thus obtained by 1-MLE(X,θ) where X corresponds to the Gaussian model learnt, θ to the current vector of parameters and MLE to the normed maximum likelihood function (MLE standing for the term Maximum Likelihood Estimation).

Figure 6:
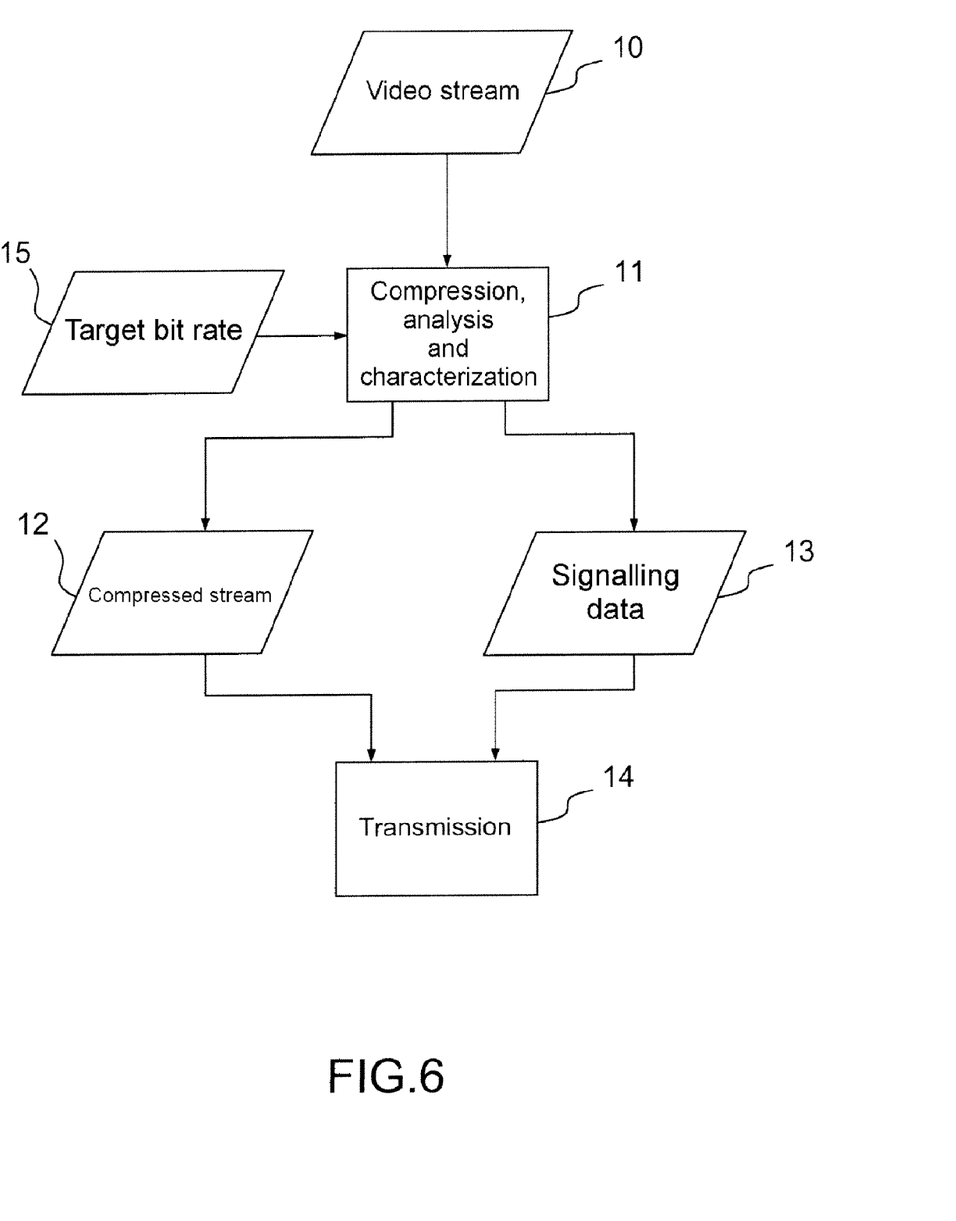
FIG. 6 illustrates an exemplary sequencing of the operations carried out by an intelligent camera of the video surveillance system according to the invention.
Figure 7:
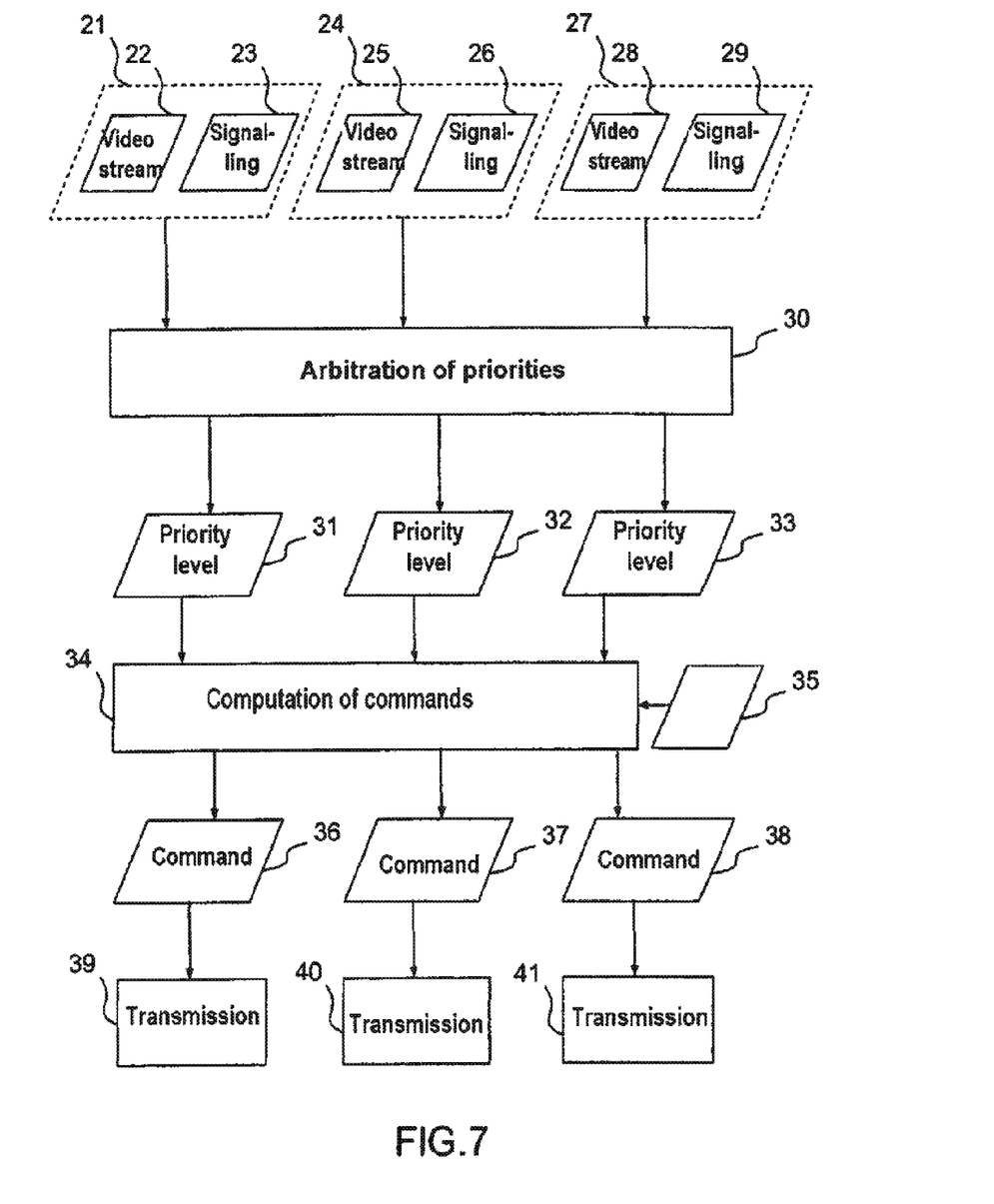
FIG. 7 illustrates an exemplary sequencing of the operations carried out by the remote server of the video surveillance system according to the invention.

The two alternatives presented previously are achievable within the framework of the invention (stream priorities determined by each of the cameras of the system or by the remote server), but to illustrate the operations executed by each of the elements with the aid of FIGS. 6 and 7, the example of the computation of priorities at the remote server level is used in the subsequent description.

FIG. 6 gives an example of the operations that may be executed by one of the intelligent cameras of the system. The video stream 10 captured by the camera 1 (FIG. 5) is compressed and analyzed in the compressed domain 11. The compression is carried out by following a target bit rate directive 15. The step of encoding, analysis and characterization of activity culminates in:
  a compressed video stream 12;
  a set of signaling data (or metadata) 13 resulting for example from the application of the tools for characterizing the compressed stream.

The compression step is furthermore parametrized by a bit rate directive emanating from the remote server 3 and optimized by the analysis in the compressed domain. Indeed, the analysis in the compressed domain can make it possible to carry out a segmentation of the images into various areas of relevance. For each of these various areas, different bit rates can then be allocated to adapt the bit rate of the video stream to the target value.

If it is considered, for example, that the most relevant part of the images of the stream is the foreground plane, the method will be able to undertake the allocation of a considerable bit rate for this part at the expense of the non-relevant part of the stream, in this case the background plane, which will be allocated a lower bit rate.

Faced with transmission errors, it is also possible to strengthen the protection in an intelligent manner by using the results of the analysis in the compressed domain. The number of redundancy bits can thus be increased for the significant parts of the images carried by the video stream considered.

Finally, the relevant part of one and the same stream (the foreground for example), may be enciphered for example out of a concern to respect privacy, this also by virtue of the results of the analysis in the compressed domain.

FIG. 7 gives an example of the operations that may be executed by the remote server. The example given considers a system where three intelligent cameras each transmit a data set 21, 24 and 27 to the remote server. These data sets consist, for example, of the video streams 22, 25, 28 and of the associated signaling data 23, 26, 29 for each of the cameras. These data are thereafter processed by the server so as to perform an arbitration of priorities 30 between the streams. Stated otherwise, the server associates a priority level 31, 32, 33 with each video stream as a function of the information carried by the signaling data.

The server thereafter uses these various levels of priorities as well as information specific to the topology and to the characteristics of the system 35 to determine 34 the reconfiguration commands 36, 37, 38 destined for each of the cameras of the system. These commands are, for example, bit rate directives which will be used to adapt the video stream compression parameters by each camera.

The commands thus computed will thereafter have to be transmitted 39, 40, 41 through the telecommunications network to the cameras concerned.

As explained previously, the commands computed by the server can consist of a target bit rate value. If each camera i is capable of dispatching a compressed video stream at a specified bit rate and if the server is in charge of managing N cameras (in the example of FIG. 7, N=3) on a network having a maximum bit rate constraint D, then the order of priority $P_i$ on the bit rate $D_i$ per camera can be taken into account for example according to the formula:

$$D_i = \frac{P_i}{\left(\sum_{j=1}^{N} P_j\right)} \times D$$

It is important to note that if in the example of FIGS. 6 and 7, the computation of the priority level of the streams is performed by the remote server, it is also possible, as described previously, to perform this computation at the level of the intelligent cameras.

It is also possible for each of the cameras to compute its bit rate $D_i$. In this case and considering that the total bit rate D does not evolve and is transmitted once and for all to every element of the network, the server will return, when the network has to be configured, a single value to all the cameras:

$$P = \sum_{j=1}^{N} P_j$$

The cameras can thereafter compute their target bit rate according to the above formula and adapt the compression of the video stream to this value.

We claim:

1. A dynamically reconfigurable video surveillance system, comprising:
   at least one video camera, a remote server, at least one viewing terminal, means for recording video sequences captured by the at least one video camera, wherein:
   the at least one video camera and the remote server comprise means for communicating with one another across a telecommunications network;
   the at least one video camera further comprises means for compressing the captured video sequences, a compression rate for compression being adapted dynamically based on control commands originating from the remote server;
   the at least one video camera further comprises means for analyzing said compressed video sequences to characterize activity detected in a field of view of the at least one video camera and to transmit a result of the characterization to the remote server in the form of signaling data; and
   the remote server further comprises means for computing, for each of the compressed video streams originating from the at least one video camera, a control command configured to parametrize each of the compressed video streams based on the signaling data received from the at least one video camera.

2. The video surveillance system as claimed in claim 1, wherein a priority level is associated, by the remote server, with each of the video streams received from the at least one video camera of the system, said priority level being determined based on the signaling data representative of the activity characterized and transmitted by the at least one video camera.

3. The video surveillance system as claimed in claim 1, wherein the remote server is configured to control the transmission of the signaling data from the at least one video camera of the system by dispatching requests configured to adapt a frequency, a type and content of messages carrying the signaling data.

4. The video surveillance system as claimed in claim 2, wherein the compression of the video sequences captured by the at least one video camera is parametrized by a bitrate directive specific to the at least one video camera, said bitrate directive being computed by the remote server based on the priority level associated with each of the video streams and being transmitted by the remote server to the at least one video camera of the system.

5. The video surveillance system as claimed in claim 1, wherein a priority level associated with the video streams is computed by the at least one video camera, said priority level being determined based on activity detected by the at least one video camera.

6. The video surveillance system as claimed in claim 5, wherein the priority level associated with the video streams is transmitted to the remote server by the at least one video camera of the system, said remote server uses the priority level to compute a bitrate constraint transmitted to the at least one video camera, and the at least one video camera adapts the compression rate to satisfy the bitrate constraint.

7. The video surveillance system as claimed in claim 5, wherein the priority level associated with the video stream is used by the at least one video camera to compute a bitrate directive, said bitrate directive being used to adapt the video stream compression rate.

8. The video surveillance system as claimed in claim 5, wherein the at least one viewing terminal comprises a display, and wherein automatic switching of the display is based on a duration determined by the priority level.

9. The video surveillance system as claimed in claim 8, wherein the display is configured to present a priority video stream accompanied by an augmented-reality mechanism to bring to the fore a portion or portions of the priority video stream containing unusual activity identified by the at least one video camera.

10. The video surveillance system as claimed in claim 9, wherein the portion or portions of the priority video stream containing the unusual activity are brought to the fore by a color highlighting.

11. The video surveillance system as claimed in claim 9, wherein the portion or portions of the priority video stream containing the unusual activity are accompanied by a message displayed on the display.

12. The video surveillance system as claimed in claim 9, wherein the portion or portions of the priority video stream containing the unusual activity identified are accompanied by an alarm telltale.

13. The video surveillance system as claimed in claim 1, further comprising a memory configured to store priority levels of the video streams and metadata originating from the at least one video camera.

14. The video surveillance system as claimed in claim 1, wherein a supervised mode of the system is configured to allow an operator to select a particular video stream, and, in response, the remote server decreases a global bitrate by ordering a maximum bitrate for the at least one video camera.

15. The video surveillance system as claimed in claim 9, wherein the augmented-reality mechanism is controlled by the remote server and said remote server is configured to transmit a request to the the at least one video camera to acquire the signaling data.

16. The video surveillance system as claimed in claim 9, wherein the portion or portions of the priority video stream containing the unusual activity are brought to the fore by one or more flashing or fixed rectangles.

* * * * *